US006674723B1

(12) United States Patent
Joo et al.

(10) Patent No.: US 6,674,723 B1
(45) Date of Patent: Jan. 6, 2004

(54) APPARATUS AND METHOD OF MONITORING A QUEUE STATE IN AN ASYNCHRONOUS TRANSFER MODE SWITCH

(75) Inventors: Sang-Wan Joo, Seoul (KR); Nae-Ho Chung, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 725 days.

(21) Appl. No.: 09/596,166

(22) Filed: Jun. 16, 2000

(30) Foreign Application Priority Data

Jun. 16, 1999 (KR) ........................................ 1999-22452

(51) Int. Cl.$^7$ ................................................ H04J 1/16
(52) U.S. Cl. ..................... 370/236.1; 370/237; 370/229
(58) Field of Search ................................. 370/229, 230, 370/230.1, 231–237, 241.1, 244, 247, 248, 249, 250–253, 391, 392, 398, 395.4, 395.21, 395.7, 395.72, 395.43, 468

(56) References Cited

U.S. PATENT DOCUMENTS

| 5,974,033 A | * | 10/1999 | Kamiya et al. | ........... 370/230.1 |
| 6,175,568 B1 | * | 1/2001 | Awdeh | ............... 370/236.1 |
| 6,377,550 B1 | * | 4/2002 | Prasad | ............... 370/236.1 |
| 6,512,743 B1 | * | 1/2003 | Fang | ..................... 370/232 |
| 6,549,517 B1 | * | 4/2003 | Aweya et al. | ........ 370/236.1 |
| 6,587,437 B1 | * | 7/2003 | Lee et al. | ............. 370/236.1 |
| 6,597,659 B1 | * | 7/2003 | Klay et al. | ................ 370/229 |

FOREIGN PATENT DOCUMENTS

| JP | 07-303117 | 11/1995 | ........... H04L/12/56 |
| JP | 10-075254 | 3/1998 | ........... H04L/12/28 |

OTHER PUBLICATIONS

Naoko Iwami, Keiko Takahara, Kazuma Yumoto, Susumu Matsui; "A Study On Realtime Video Communication over LAN", Apr. 22, 1994, pp. 61–67.

* cited by examiner

*Primary Examiner*—Dang Ton
*Assistant Examiner*—Phuc Tran
(74) *Attorney, Agent, or Firm*—Cha & Reiter

(57) ABSTRACT

Disclosed is an apparatus and method of monitoring the queue state of a switch in the subscriber board of an asynchronous transfer mode switching system. A difference value between the present time value and a previous input time value stored in a memory per connection is inputted to a forward resource management (FRM) cell when a resource management (RM) cell is inputted from a source, and a switch load measurement value written in the FRM cell is obtained by calculating the difference value between the present time value and a previous output time value stored in the memory per connection when the FRM cell transmitted from the source passes through the switch. The obtained switch load measurement value is inputted to a backward resource management (BRM) cell transmitted from a destination to be transmitted to the switch. The queue state of the switch is determined by identifying the switch load measurement value which is applied to the BRM cell that is transmitted from the destination via the switch, then an explicit cell rate (ER) value is calculated according to the queue state of the switch and the ER value is applied to the BRM cell to be transmitted to the source.

13 Claims, 4 Drawing Sheets

APPARATUS AND METHOD OF MONITORING A QUEUE STATE IN AN ASYNCHRONOUS TRANSFER MODE SWITCH

CLAIM OF PRIORITY

This application makes reference to, incorporates the same herein, and claims all benefits accruing under 35 U.S.C. Section 119 from an application for APPARATUS AND METHOD OF MONITORING A QUEUE STATE IN AN ASYNCHRONOUS TRANSFER MODE SWITCH filed earlier in the Korean Industrial Property Office on Jun. 16, 1999 and there duly assigned Serial No. 22452/1999.

BACKGROUND OF THE INVENTION

1. Field of the Invention

The present invention relates generally to an asynchronous transfer mode switching system. More particularly, the present invention relates to an apparatus and method for monitoring the queue state of an asynchronous transfer mode (ATM) switch to control the traffic of a subscriber board in non-real time.

2. Description of the Related Art

An available bit rate (ABR) service is one of the ATM service categories defined by the ATM forum. In ABR service, resource management cells allow connection end points to request higher (or lower) cell transmission rates according to the temporal needs of the application, and the source rate is controlled by establishing a minimum bandwidth through a resource management (RM) cell for which the user may expect a low cell loss ratio for the duration of connection. Thus, it is necessary to effectively calculate the available bandwidth in the ATM switching system.

However, the conventional ATM switch has drawbacks in that the algorithms for calculating the available bandwidth of a switch node for a determined time are complicated. Moreover, the conventional ATM switching system is not provided with any communication path for informing the state of an internal queue. Currently, even if the paths for informing the state of the internal queue can be provided in the conventional ATM switching system, it is not easy to implement an apparatus for informing the state of the queue existing in various paths for a connection.

SUMMARY OF THE INVENTION

Accordingly, the present invention has been made in an effort to solve the problems occurring in the related art, and an object of the present invention is to provide an apparatus and method for monitoring the state of a queue when the connected calls pass through the ATM switch in a subscriber board.

Another object of the present invention is to provide a queue state monitoring apparatus and method capable of rapidly and accurately detecting congestion conditions according to the traffic change of an ATM switch in a subscriber board.

Still another object of the present invention is to provide a queue state monitoring apparatus which can effectively calculate an available bandwidth in an ATM switching system to support the available bit rate (ABR) service in a subscriber board.

In order to achieve the above objects in accordance with the present invention, the difference between the present time value and the previous input time value stored in a memory per connection is inputted to a forward resource management (FRM) cell when the FRM cell is transmitted from a source end to a destination end. When the FRM cell from the source passes through an ATM switch, the difference between the present output time value and the previous output time value stored in a memory is derived to determined a switch load measurement value, which is obtained by calculating the difference between the input time value difference and the output time value difference. Then, the calculated switch load measurement value is inputted to a backward resource measurement (BRM) cell transmitted from a destination back to the ATM switch. The queue state in the ATM switch is observed through the switch load measurement value, which is inputted to the BRM cell transmitted from the destination end via the ATM switch, and accordingly, an explicit cell rate (ER) value corresponding to the queue state is calculated so that the calculated ER value can be inputted to the BRM cell to be sent to the source end.

BRIEF DESCRIPTION OF THE DRAWINGS

The above objects and advantages of the present invention will become more apparent by describing in detail the preferred embodiments with reference to the attached drawings in which.

DETAILED DESCRIPTION OF THE PREFERRED EMBODIMENTS

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
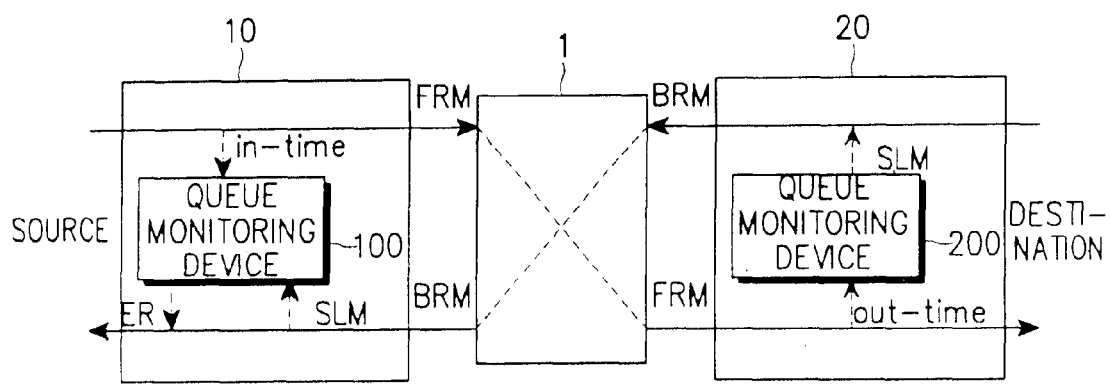
FIG. 1 is a view illustrating the flow of a cell in an ATM switching system according to the present invention.

FIG. 1 is a view illustrating the flow of a cell in the ATM switching system according to the present invention.

With reference to FIG. 1, a subscriber board 10 transmits a resource management (RM) cell inputted from a source to an ATM switch 1. At this time, a queue monitoring device 100 of the subscriber board 10 detects an input time point (in-time) representing the time when the RM cell is inputted to the switch 1, then determines the difference between the input time of the presently inputted RM cell and the input time of the previously inputted RM cell stored in the memory. The queue monitoring device 100 then applies the difference time value to a forward resource management (FRM) cell to be transferred to the switch 1. The switch 1 switches the FRM cell transmitted from the subscriber board 10 from the source end and transmits the switched FRM cell to a subscriber board 20 to the destination end.

The subscriber board 20 transmits the FRM cell from the switch 1 to the destination. At this time, a queue monitoring device 200 of the subscriber board 20 detects an output time point (out-time) as the RM cell outputted from the switch 1. The queue then obtains the difference between the output time of the present RM cell and the previous RM cell stored in the memory. The queue monitoring device 200 then obtains a switch load measurement (SLM) value using the difference between the output time difference of the RM cell at the destination end and the input time difference of the transmitted RM cell at the source end carried by the FRM cell. The monitoring device 200 then applies the obtained SLM value to a backward resource management (BRM) cell to transmit the SLM value to the switch 1. Thereafter, the switch 1 switches the BRM cell transmitted from the subscriber board 20 of the destination end to the subscriber board 10 of the source end. The subscriber board 10 at the source end receives the switched BRM cell from the switch 1 and controls the transmission speed of the cell by detecting the queue state in the switch 1 using the queue monitoring device 100. At this time, the queue monitoring device 100 determines the schedule rate (SR) value and the explicit cell rate (ER) value by detecting the queue state in the switch 1 based on the SLM value carried by the BRM cell. The SR and ER values are all defined in the ATM forum TM 4.0.

Figure 2:
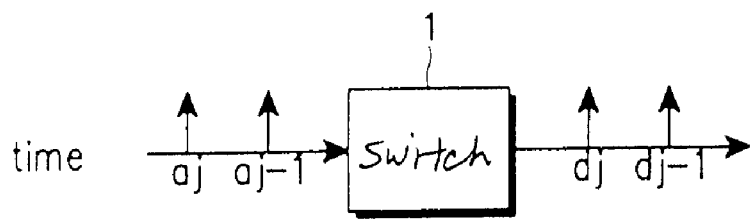
FIG. 2 is a view illustrating the timing of the operation of the queue monitoring apparatus according to the present invention.

FIG. 2 is a view illustrating the timing of the operation of the queue monitoring apparatus according to the present invention.

With reference to FIGS. 1 and 2, an input time point (in-time) refers to an arrival time point of the RM cell at the subscriber board 10 and an output time point (out-time) refers to a time point when the RM cell is outputted to the subscriber board 20 via the switch 1. The input time difference ($\Delta\text{in-time}=a_j-a_{j-1}$) represents the difference between an arrival time point $a_j$ of the present RM cell and an arrival time point $a_{j-1}$ of the previous RM cell, and the output time difference ($\Delta\text{out-time}=d_j-d_{j-1}$) represents the difference between a time point $d_j$ when the present RM cell passes through the switch 1 and a time point $d_{j-1}$ when the previous RM cell passed through the switch 1. A switch load measurement value (SLM=$\Delta\text{out-time}-\Delta\text{in-time}$) represents the difference between the input time difference ($\Delta\text{in-time}$) and the output time difference ($\Delta\text{out-time}$). At this time, if the SLM value is greater than zero, this means that the internal queue of the switch 1 is in a congested state. The SLM value of zero or less means that the internal queue of the switch 1 is in a normal state or in an under-load state.

Now, referring to FIGS. 1 and 2, the operation of the apparatus for monitoring the state of the internal queue of the switch in the subscriber board of the ATM switching system according to the present invention will be explained. The embodiment of the present invention exemplifies the case where a cell transmitted from the subscriber board 10 is switched and transmitted to the subscriber board 20. Here, the transmission of the RM cell from the source to the destination is defined as a forward direction of the RM cell and the transmission of the RM cell from the destination to the source is defined as a backward direction.

If the RM cell is inputted from the source to the subscriber board 10, the queue monitoring device 100 calculates the input time difference ($\Delta\text{in-time}$) by subtracting the input time of the previous cell stored in the internal memory from the present time point as the cell is inputted, then applies the calculated input time difference value to the FRM cell.

Thereafter, the subscriber board 10 transmits the FRM cell carrying the input time difference value inputted by the queue monitoring device 100 to the switch 1. Accordingly, the switch 1 receives the FRM cell transmitted from the subscriber board 10 and switches the FRM cell to the subscriber board 20 of the corresponding destination.

If the RM cell to be transmitted to the destination is transmitted to the subscriber board 20 through the switch 1, the queue monitoring device 200 obtains the output time difference ($\Delta\text{out-time}$) by subtracting the previous output time stored in the memory from the present time for its connection. Thereafter, the queue monitoring device 200 determines the SLM value ($\Delta\text{out-time}-\Delta\text{in-time}$) by comparing the output time difference ($\Delta\text{out-time}$) with the previous input time difference ($\Delta\text{in-time}$) written in the FRM cell, then applies the determined SLM value to the BRM cell. Then, the subscriber board 20 transmits the BRM cell having the SLM value inputted therein to the switch 1. Accordingly, the switch 1 switches the BRM cell transmitted from the subscriber board 20 of the destination end to the subscriber board 10 of the source end.

The queue monitoring device 100 identifies the internal queue state of the switch 1 by extracting the SLM value inputted to the BRM cell that is transmitted from the destination through the switch 1, then calculates the corresponding ER value and applies the calculated ER value to the BRM cell to be transferred to the source so that the flow of cell rate can be adjusted.

Figure 3:
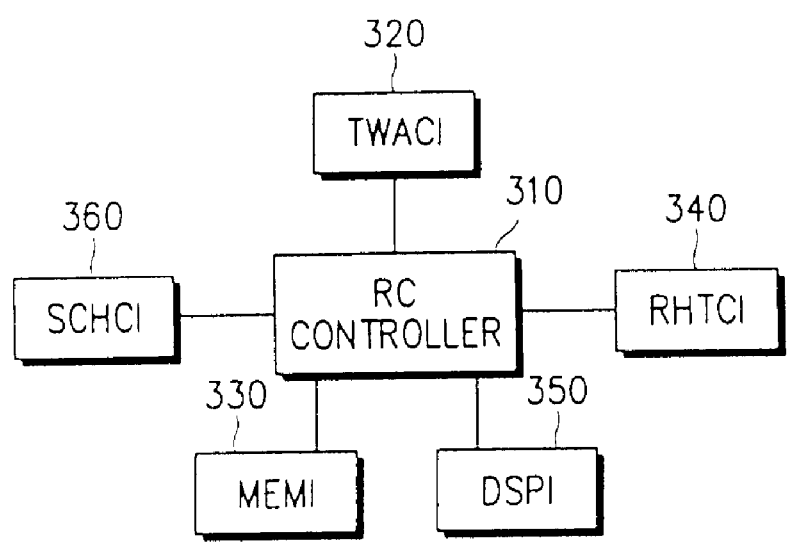
FIG. 3 is a block diagram of a queue state monitoring apparatus in an ATM switch in a subscriber board according the embodiment of the present invention; and, FIGS. 4a to 4c are views explaining the operation of the queue monitoring apparatus according to the embodiment of the present invention.

FIG. 3 illustrates a block diagram of the queue state monitoring devices 100 and 200 in an ATM switch in a subscriber board according the embodiment of the present invention.

With reference to FIG. 3, the operation of the queue monitoring devices 100 and 200 in the subscriber board according to the present invention will now be explained. A rate control block (RC) controller 310 controls respective blocks 320–360 of the queue monitoring devices 100 and 200.

A time-stamp/warp attachment circuit interface block (TWACI) 320 transfers the input time information of the corresponding connection upon receiving the FRM cell, while it transfers the SLM value upon receiving the BRM cell to the RHTCI 340. That is, the TWACI 320 converts the connection identification and direction into an address and obtains the input time value or the SLM value from a memory table by accessing a memory interface block (MEMI) 330.

The memory interface block (MEMI) 330 controls the access of the memory table and enables data values to be timely read or written.

A routing header translator circuit interface block (RHTCI) 340 receives the FRM cell or the BRM cell depending on the flow of RM cells from a routing header transmitter. If the input cell is the FRM cell, the RHTCI 340 determines the SLM value by comparing the input time value with the output time value and writes the calculated SLM value in the memory table. If the input cell is the BRM cell, the RHTCI 340 extracts the SLM value and transfers the SLM value to a digital signal processor interface block (DSPI) 350 to calculate the speed value as set forth under the ATM forum TM 4.0.

The DSPI 350 transfers the received switch load measurement value to a digital signal processor (DSP) and updates the memory table by reading the calculated cell speed value. Specifically, if the DSPI 350 receives the SLM value from the RHTCI 340, it enables the DSP to generate interrupt and to perform the speed calculation. If the speed calculation is completed in the DSP, the DSPI 350 sets the calculated value in the registers. When the register bits are set, the DSPI 350 reads this value and updates the memory table accordingly.

A scheduler circuit interface block (SCHCI) 360 transfers a scheduling speed to a scheduler if it receives the change of the scheduling speed from the RC controller 310.

Figure 4A:
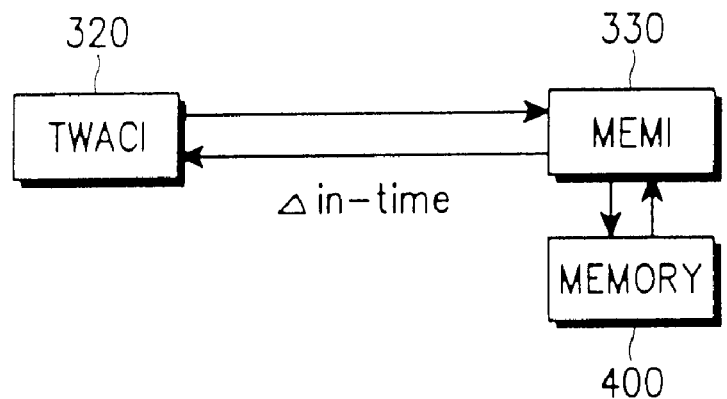

FIG. 4a illustrates the process according to the present invention when the queue monitoring device receives the RM cell from the source and transmits the FRM cell to the switch 1.

With reference to FIGS. 1 to 4a, the TWACI 320 obtains the arrival time point of the RM cell from the source, reads out the input time value previously stored in a memory 400 through the MEMI 330, then calculates and writes the input time difference in the RM cell. The TWACI 320 also updates the memory with the arrival time point of the newly inputted RM cell through the MEMI 330 in accordance with a connection identification.

In other words, if the RS controller 310 detects the RM cell inputted from the TWACI 320, it obtains the input time difference by searching the input time of the previous RM cell stored in the memory through the MEMI 330. Then, the RM controller 310 applies the information on the input time difference of the RM cell obtained by the TWACI 320 in the FRM cell and transmits the FRM cell to the switch 1.

Figure 4B:
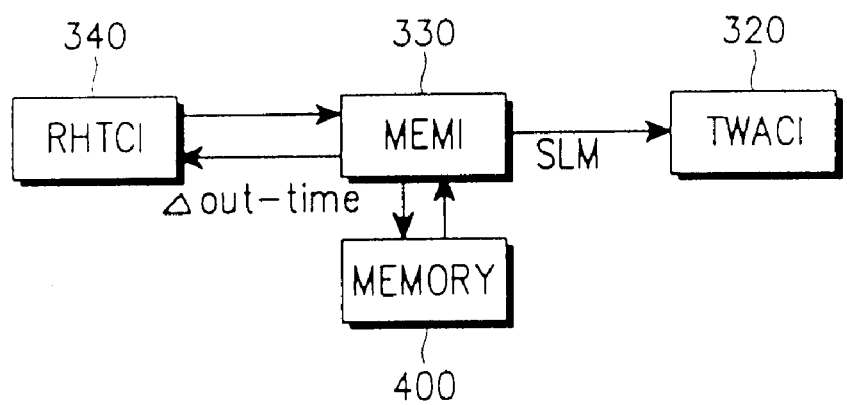

FIG. 4b illustrates the process according to the present invention when the queue monitoring device receives the FRM cell from the switch 1, calculates the SLM value, and applies the calculated SLM value in the BRM cell to transmit the BRM cell to the switch 1.

With reference to FIGS. 1 and 4b, if the RS controller 310 receives the FRM cell switched through the switch 1, it obtains the output time difference by searching the output time of the previous RM cell stored in the memory 400 through the MEMI 330. Then, the RM controller 310 updates the memory 400 with the newly obtained output time along with the connection identification through the MEMI 330. Thereafter, the RM controller 310 calculates the SLM value by the calculated output time difference and the input time difference, applies the SLM value to the BRM cell, and transmits the BRM cell to the switch 1 through the TWACI 320.

Figure 4C:
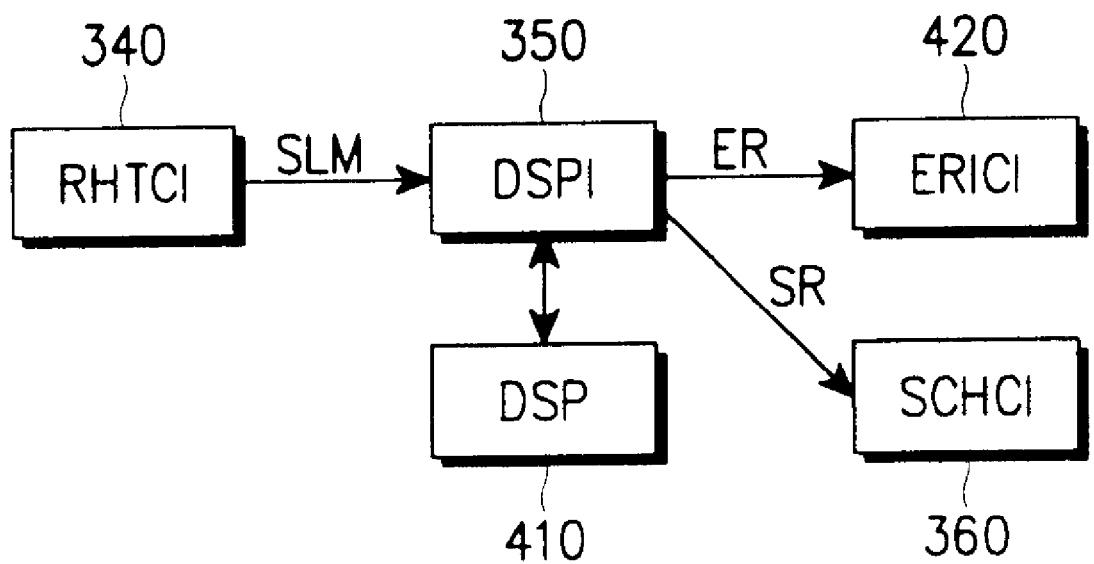

FIG. 4c illustrates the process according to the present invention when the queue monitoring device detects the queue state and calculates the transmission speed.

With reference to FIGS. 1 and 4c, the RHICI 340 extracts the SLM value from the BRM cell transmitted from the switch 1 and transmits the SLM value to the DSP 410 through the DSPI 350. Then, the DSP 350 detects the queue state in the switch 1 by the transmitted SLM value and calculates the ER value and the SR value accordingly. The DSPI 350 transfers the ER value calculated by the DSP 410 to the ERICI 420 and transfers the SR value to the SCHCI 360.

As described above, the present invention has advantages in that the queue state of the switch is detected by the subscriber board of the ATM switching system, thus the ABR traffic control can be facilitated.

While this invention has been described in connection with what is presently considered to be the most practical and preferred embodiments, it is to be understood that the invention is not limited to the disclosed embodiment; on the contrary, it is intended to cover various modifications within the spirit and the scope of the appended claims.

What is claimed is:

1. An apparatus for monitoring a queue state in a subscriber board of an asynchronous transfer mode switching system, comprising:

a memory for storing an input time of a resource management (RM) cell transmitted from a source and an output time of the RM cell after passing through a switch at a destination;

a forward resource management (FRM) processing section for calculating an input time difference by detecting a time difference between a current RM cell and a previous RM cell stored in the memory as the respective RM cells are inputted from the source, and for applying the calculated input time difference to an FRM cell to be transmitted to the switch;

a backward resource management (BRM) processing section for calculating an output time difference by detecting a time difference between a current RM cell and a previous RM cell stored in the memory as the respective RM cells are passed through the switch, and for applying the calculated output time difference to an BRM cell to be transmitted to the switch;

a speed calculation section for determining a time difference value between the input time difference and the output time difference based on the BRM cell transmitted from the switch and for calculating an explicit cell rate (ER) value and a schedule rate (SR) value based on the time difference value; and, a speed control section for determining a queue state of the switch according to the time difference value between the input time difference and the output time difference and for controlling the transmission speed of the cell according to the ER value and the SR value calculated by the speed calculation section.

2. The apparatus as claimed in claim 1, wherein the speed control section determines that the queue of the switch to be in a congested state if the output time difference is greater than the input time difference.

3. The apparatus as claimed in claim 1, wherein the speed control section determines the queue of the switch to be in a normal state if the output time difference is equal to or less than the input time difference.

4. An apparatus for monitoring the queue state in a subscriber board of an asynchronous transfer mode switching (ATM) system, said ATM system having at least one source node and at least one destination node, said apparatus comprising:

a means for transmitting a forward resource management (FRM) cell to said ATM switch, said FRM cell containing a field having a first time difference between a present time and a previous time as said FRM cell is inputted to said ATM switch;

a means for reading said FRM cell to determine a second time difference between a present output time and a previous output time as said FRM cell is transmitted from said ATM switch in order to calculate a switch load measurement (SLM) value, said SLM value is calculated based on the difference between said first time difference and said second time difference, said calculated SLM is inserted in the field of a backward management (BRM) cell to be transferred to said ATM switch;

a means for storing and updating said input time of said FRM cell and said output time of said BRM cell;

a means for calculating an explicit cell rate (ER) according to said calculated SLM value in order to explicitly control the transmission rate of said source node and to control the congestion of said ATM switch.

5. The apparatus as claimed in claim 4, wherein said explicit cell rate (ER) is calculated if said SLM value is greater than zero.

6. The apparatus as claimed in claim 4, wherein said ATM switch is in a congestion state if said second time difference information is greater than said first time difference information.

7. The apparatus as claimed in claim 4, wherein said ATM switch is in a normal state if said second time difference information is equal to or less than said first time difference information.

8. A method for monitoring the queue state in an asynchronous transfer mode (ATM) switch, comprising the steps of:

(a) transmitting a forward resource management (FRM) cell from a source node connected by a virtual channel to a destination node via said ATM switch, said FRM cell containing a field having a first time difference information between a present input time and a previous input time as said FRM cell is inputted to said ATM switch;

(b) reading, by said destination node, said FRM cell transmitted from said source node via said ATM switch and determining a second time difference information between a present output time and a previous output time as said FRM cell is read by said destination node;

(c) determining a switch load measurement (SLM) value by calculating the difference value between said first time difference information in said FRM cell and said second time difference information;

(d) inputting said determined SLM value by in a field of a backward management (BRM) cell to be transferred to said ATM switch;

(e) calculating an explicit cell rate (ER) based on said SLM value contained in said BRM cell received from said destination node; and, (f) inputting said determined explicit cell rate to said BRM cell to be transferred to said source node in order to explicitly control the transmission rate of said source node and to control the congestion of said ATM switch.

9. The method as claimed in claim 8, wherein said explicit cell rate (ER) is calculated if said SLM value is greater than zero.

10. The method as claimed in claim 8, wherein the fourth step includes the step of calculating a schedule rate (SR) value according to the queue state of the switch.

11. The method as claimed in claim 8, wherein said previous input time and said previous output time are stored in a memory.

12. The method as claimed in claim 8, wherein said ATM switch is in a congestion state if said second time difference information is greater than said first time difference information.

13. The method as claimed in claim 8, wherein said ATM switch is in a normal state if said second time difference information is equal to or less than said first time difference information.

* * * * *